(12) United States Patent
Yoshida

(10) Patent No.: US 6,226,076 B1
(45) Date of Patent: May 1, 2001

(54) DISTANCE MEASURING APPARATUS USING PULSE LIGHT

(75) Inventor: Hisashi Yoshida, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/518,245

(22) Filed: Mar. 3, 2000

Related U.S. Application Data

(63) Continuation of application No. PCT/JP98/03890, filed on Sep. 1, 1998.

(30) Foreign Application Priority Data

Sep. 4, 1997 (JP) .................................................. 9-239873

(51) Int. Cl.⁷ ...................................................... G01C 3/08
(52) U.S. Cl. ........................................ 356/5.06; 356/5.01
(58) Field of Search ................................... 356/5.01–5.08

(56) References Cited

U.S. PATENT DOCUMENTS

| | | | |
|---|---|---|---|
| 4,113,381 | 9/1978 | Epstein | 356/5 |
| 4,367,934 | 1/1983 | Matsui | 354/25 |
| 4,553,836 | * | 11/1985 | Meier et al. |
| 4,634,272 | * | 1/1987 | Endo |
| 5,815,251 | 9/1998 | Ehbets et al. | 356/5.01 |
| 5,949,531 | 9/1999 | Ehbets et al. | 356/5.01 |

FOREIGN PATENT DOCUMENTS

| | | |
|---|---|---|
| 649 633 | 5/1985 | (CH) . |
| 0100387 | 2/1984 | (EP) . |
| 0 738 899 | 10/1996 | (EP) . |
| 53-64056 | 6/1978 | (JP) . |
| 59-24397 | 6/1984 | (JP) . |
| 3-21502 | 5/1991 | (JP) . |

* cited by examiner

Primary Examiner—Stephen C. Buczinski
(74) Attorney, Agent, or Firm—Foley & Lardner

(57) ABSTRACT

The present invention relates to a distance measuring apparatus and method having a structure enabling highly accurate distance measurement. In particular, the distance measuring apparatus according to the present invention comprises at least a measurement system for detecting, of measurement pulse light emitted into a measurement optical path toward a target, information concerning a reflected beam from the target. In order to prevent undesirable reflected beams, which form erroneous information, among reflected beams of the measurement pulse light from being received, an operation for detecting reflected beams of the measurement pulse light is inhibited for a predetermined period of time from the emitting time at which the measurement pulse light is emitted.

9 Claims, 16 Drawing Sheets

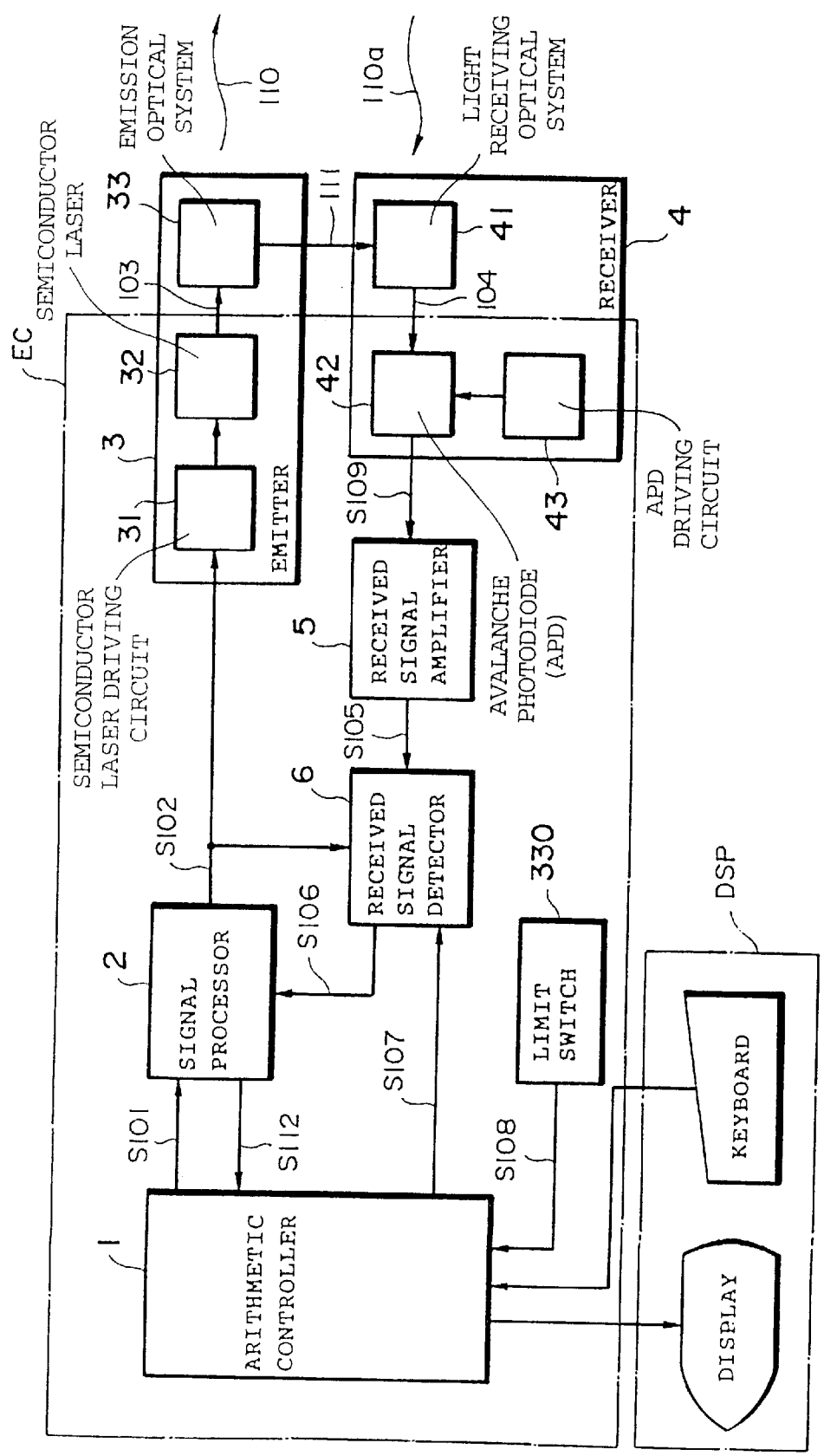

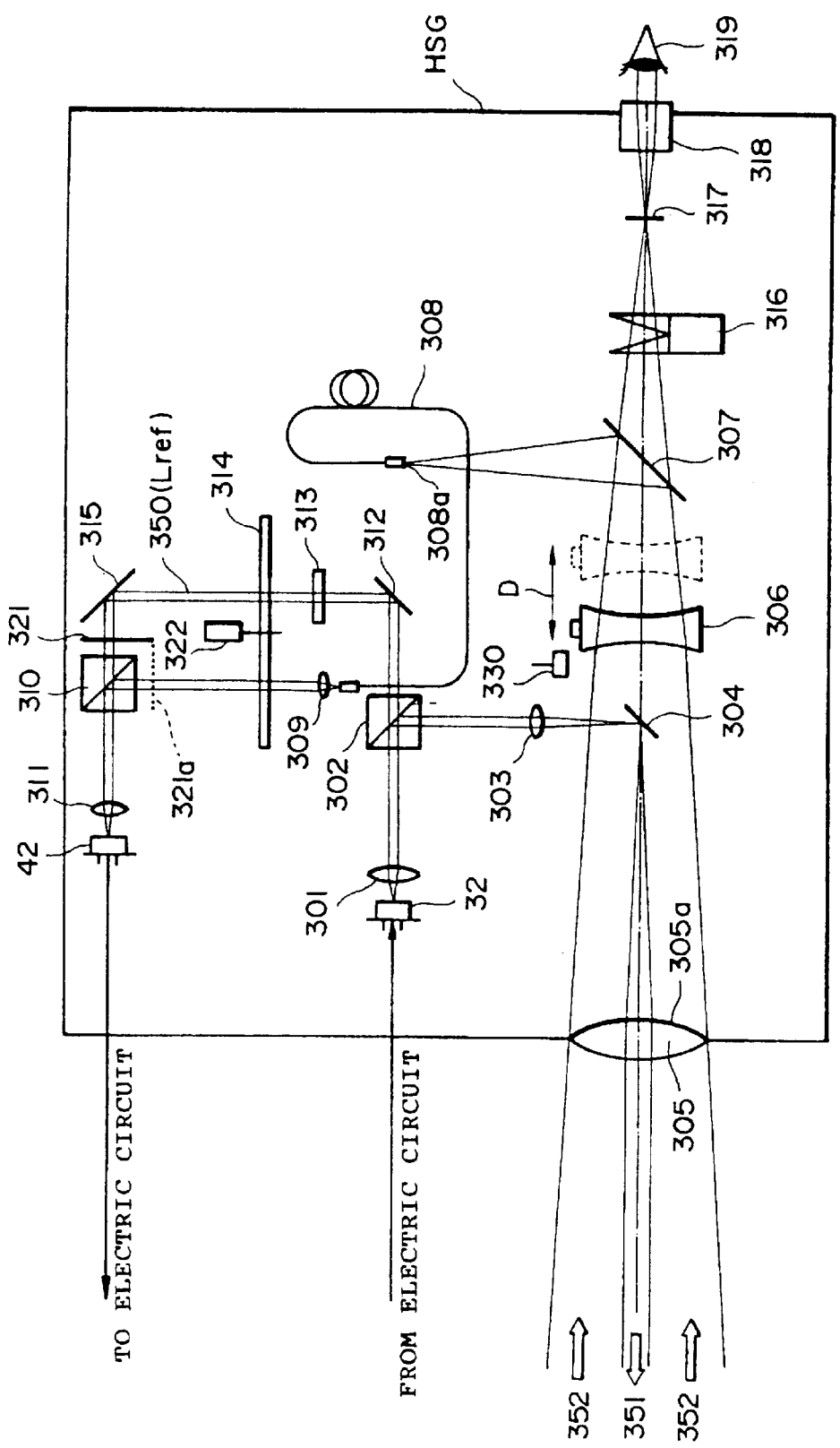

Fig.6A
Fig.6B
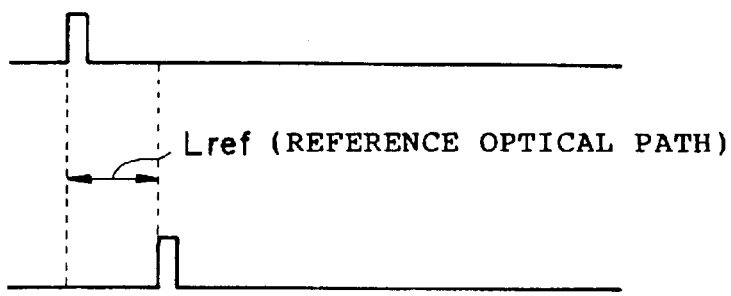
Fig.6C
Fig.6D
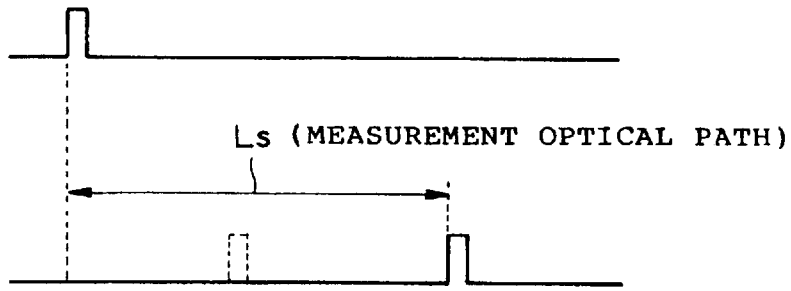

Fig.16A
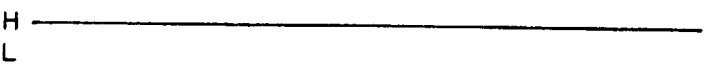
Fig.16B
Fig.16C
Fig.16D
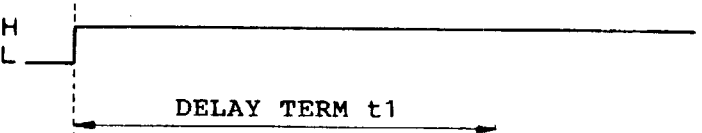
Fig.16E
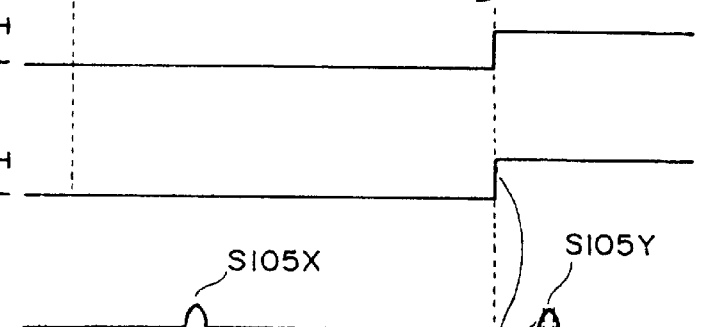
Fig.16F
Fig.16G
Fig.16H
Fig.16I
Fig.16J
Fig.16K
Fig.16L
Fig.16M

DISTANCE MEASURING APPARATUS USING PULSE LIGHT

RELATED APPLICATIONS

This is a continuation application of International patent application Ser. No. PCT/JP98/03890 filed on Sep. 1, 1998, now pending.

BACKGROUND OF THE INVENTION

1. Field of the Invention

The present invention relates to a distance measuring apparatus for measuring a distance to a target by using pulse light.

2. Related Background Art

It has been known that optical systems for distance measuring apparatus using light are roughly classified into two kinds, i.e., biaxial and coaxial types, depending on the arrangement of their light-transmitting optical path through which measurement pulse light is propagated and light-receiving optical path through which a reflected beam of the measurement pulse light is propagated. The light-transmitting optical path and the light-receiving optical path constitute a measurement optical path. Of these two types of optical systems, the coaxial optical system is advantageous from the viewpoints of reducing the size of apparatus, eliminating parallax, and making the light-transmitting optical path coincide with a collimation optical system for focusing onto a target. It is due to the fact that the coaxial optical system has a configuration in which the light-transmitting axis for transmitting light to the target and the light-receiving axis for receiving the reflected beam from the target coincide with each other.

Also, this kind of distance measuring apparatus includes those employing a continuous modulation system in which a light source such as LED, semiconductor laser, or the like is continuously modulated, thereby the distance to the target is determined from the phase difference between the transmitted light and the received light; and those employing a pulse system in which a semiconductor laser is used as a light source, thereby the distance to the target is determined from the period of time between the time at which pulse light is transmitted and the time at which part of thus transmitted light is returned after being reflected by the target.

In order to respond to the demand for enhancing the range capable of distance measurement and the demand for the ability of non-prism measurement in which reflectors such as corner cube reflector are not used at the measuring point for saving labor and attaining efficient operation, the pulse system adapted to employ a large peak power is quite advantageous.

Meanwhile, in the distance measuring apparatus using a coaxial optical system, when the output of the light source is intensified in view of the demand for enhancing the range capable of distance measurement and the demand for the ability of non-prism measurement, reflections within the apparatus such as those at the inner side face of an objective lens and the inner face of a lens barrel may be received by a light-receiving device as flare, thereby yielding a large error in measured values. Though the pulse system is quite advantageous for the demand for enhancing the range capable of distance measurement and the like, the pulse light has a greater peak, thus increasing the magnitude of flare, thereby yielding a larger error in measured values in the pulse system.

Methods for eliminating the error in measured values caused by flare are disclosed, for example, in U.S. Pat. No. 4,113,381 and Japanese Utility Model Publication No. 3-21502. These methods employ a configuration in which the emission optical system and the light-receiving optical system are optically separated from each other, so as to eliminate flare.

SUMMARY OF THE INVENTION

Having studied the foregoing prior art, the inventor has found the following problems. Namely, the optical systems of the prior art are configured such that a smaller-diameter lens barrel accommodating the emission optical system is disposed in front of a larger-diameter lens barrel accommodating the light-receiving optical system so as to be coaxially supported. Therefore, a collimation optical system for collimating the target cannot be disposed on the same axis as the optical axis of the measurement optical system (including the light-receiving optical system and emission optical system), since the collimation optical system is blocked by the smaller-diameter lens barrel disposed in front thereof. As a consequence, in the case of non-prism measurement in particular, it becomes difficult for a measurer to recognize the measuring point, thus yielding a large drawback in the distance measurement. Also, since the light source is disposed in front of a large-diameter lens which functions as a light-receiving lens, the wiring of the power supply to the light source and the like may obstruct the light-receiving lens, thus clearly indicating a structural problem which causes the quantity of received light to decrease.

In view of such conventional problems, it is an object of the present invention to provide a highly accurate distance measuring apparatus and method which enhance the range capable of distance measurement, improve the non-prism distance measuring ability, and are free from influences of flare.

The distance measuring apparatus according to the present invention comprises two measurement systems, i.e., one for detecting, of measurement pulse light emitted into a measurement optical path toward a target, information concerning a component reflected from the target, and the other for detecting information concerning reference pulse light emitted into a reference optical path; and a structure enabling highly accurate distance measurement by comparing the results of measurement obtained from these measurement systems.

Specifically, the distance measuring apparatus according to the present invention comprises an emitter for emitting measurement pulse light into a measurement optical path between the apparatus and a target; a receiver for receiving a reflected beam (reflected component) of the measurement pulse light emitted into the measurement optical path; a detector for specifying a receiving time at which the reflected beam of the measurement pulse light is received; and a controller for measuring the period of time between an emitting time at which the measurement pulse light is emitted and the receiving time of the reflected beam of the measurement pulse light and calculating an optical path length of the measurement optical path on the basis of thus obtained time information. In this configuration, in particular, when the calculated value obtained in the initial measurement operation (pre-measurement operation) for the measurement optical path is not greater than a predetermined value, the controller inhibits the detector from effecting the specifying operation for a predetermined period of time from the emitting time of the measurement pulse light in the next measurement operation (main measurement operation) for the measurement optical path.

The distance measuring apparatus according to the present invention can further comprise therein a reference optical path which is different from the measurement optical path, and a switching mechanism for causing the receiver to selectively receive one of the reflected beam of the measurement pulse light propagated through the measurement optical path and reference pulse light propagated through the reference optical path so as to selectively measure the respective optical path lengths of the measurement optical path and the optical path length of the reference optical path.

It is presumed that, of the unnecessary reflected beam (flare) generated within the apparatus, the part having a strong power (pulse light having a power greater than a threshold which is set for eliminating noise) propagates by a shorter distance than the reflected beam from the target does, thereby reaching a pulse receiving element faster than the latter component does. The distance measuring apparatus according to the present invention inhibits flare, which may be mistaken as the reflected beam from the target, from being received, and securely receives the reflected beam from the target.

The distance measuring method realized by the measurement distance measuring apparatus having the above-mentioned configuration thus carries out the pre-measurement operation for confirming occurrence of flare, and the main measurement operation for eliminating the influence of flare.

Strictly speaking, the measurement optical path refers to a path extending from a pulse generating source to a pulse receiving element by way of a target positioned outside the apparatus, whereas the reference optical path refers to a path disposed within the apparatus so as to extend from the pulse generating source to the pulse receiving element. The emitting time at which the measurement pulse light is emitted refers to the point of time when a control signal to be fed into a driving circuit for driving the pulse generating source is generated, whereas the receiving time at which the reflected beam of the measurement pulse light is received refers to the point of time when a received signal generated upon arrival of the pulse light at the pulse receiving element is detected.

In addition to the constituents mentioned above, the distance measuring apparatus according to the present invention can further comprise a collimator having an optical system for focusing an image of the target onto a predetermined position. In this case, when the distance value from the apparatus to the target corresponding to the in-focus position of the optical system in the collimator is not less than a predetermined value, the controller inhibits the detector from effecting the specifying operation for a predetermined period of time from the emitting time at which the measurement pulse light is emitted in the measurement operation for the measurement optical path.

Though it is sufficient for inhibiting the received signal from being detected only for a predetermined period of time from the emitting time of the measurement pulse light as mentioned above in the case where the target is relatively far, it may not be able to judge whether the received light is the reflected beam from the target or flare generated within the apparatus in the case where the target is located at a relatively short distance. As a consequence, in an apparatus having a collimator, the optical system of the collimator for focusing the target image onto a predetermined position is adjusted beforehand, and the controller judges whether to inhibit the operation of the detector for a predetermined period of time or not as mentioned above according to the in-focus position of the optical system.

In this configuration, a limit switch for detecting the position of the optical system of the collimator may be provided (which is configured, for example, such as to turn on when a predetermined optical element in the optical system moves to a predetermined position), thereby judging whether the target is far or near.

In the distance measuring method realized by the distance measuring apparatus comprising a collimator, the measurement operation is carried out on the basis of the result obtained upon the collimating operation.

In the distance measuring apparatus and method according to the present invention, as mentioned above, the optical path length of the measurement optical path is measured, and the optical path length of the reference optical path is selectively measured. By obtaining the difference between the length of the measurement optical path and the length of the reference optical path as the distance from the apparatus to the target, the distance measuring apparatus and method enable highly accurate distance measurement.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 4 is a block diagram showing a schematic configuration of the distance measuring apparatus (telescope unit TSU) according to the present invention;

FIG. 5 is a view showing a configuration of an optical system in the distance measuring apparatus according to the present invention;

FIGS. 6A to 6D are timing charts for explaining a measuring method utilizing pulse light, in which FIGS. 6A and 6C show timings for generating an emission instructing signal S102, FIG. 6B shows a timing for generating a receive timing signal S106 when measuring the reference optical path, and FIG. 6D shows a timing for generating the receive timing signal S106 when measuring the measurement optical path;

FIGS. 7A to 7D are timing charts showing signal generating timings in the case where the distance between the target and the distance measuring apparatus is short, in which FIG. 7A shows a timing for generating a received pulse signal S105 before adjusting light quantity, FIG. 7B shows a timing for generating the received pulse signal S105 after adjusting the light quantity, FIG. 7C shows a timing for generating an active state signal of a received signal detector 6, and FIG. 7D shows a timing for generating the received pulse signal S106;

FIGS. 8A to 8D are timing charts showing signal generating timings in the case where the distance between the target and the distance measuring apparatus is long, in which FIG. 8A shows a timing for generating the received pulse signal S105 before adjusting light quantity, FIG. 8B shows a timing for generating the received pulse signal S105 after adjusting the light quantity, FIG. 8C shows a timing for generating the active state signal of the received signal detector 6, and FIG. 8D shows a timing for generating the received pulse signal S106;

FIGS. 9A to 9D are timing charts showing individual signal generating timings when flare is ignored in the case where the distance between the target and the distance measuring apparatus is long, in which FIG. 9A shows a timing for generating the received pulse signal S105 before adjusting light quantity, FIG. 9B shows a timing for generating the received pulse signal S105 after adjusting the light quantity, FIG. 9C shows a timing for generating the active state signal of the received signal detector 6, and FIG. 9D shows a timing for generating the received pulse signal S106;

FIGS. 13A to 13M are timing charts of individual signals when no flare occurs, in which FIG. 13A shows a timing for generating a pulse selecting signal S107, FIG. 13B shows a timing for generating a pulse selecting signal S107A, FIG. 13C shows a timing for generating an emission instructing signal S102, FIG. 13D shows a timing for outputting a signal S601 from an AND circuit 66, FIG. 13E shows a timing for outputting a signal S602 from an AND circuit 67, FIG. 13F shows a timing for outputting a signal S602A from a delay element 69, FIG. 13G shows a timing for outputting a signal (active state signal) S603 from an OR circuit 65, FIGS. 13H and 13K show timings for generating the received pulse signal S105, FIG. 13I shows a timing for outputting a signal S604 from a comparator 62, FIG. 13J shows a timing for outputting a signal S605 from a latch circuit 70, FIG. 13L shows a timing for outputting a signal S105A from a delay element 64, and FIG. 13M shows a timing for outputting a signal S106 from a comparator 61;

FIGS. 16A to 16M are timing charts of individual signals when flare occurs, in which FIG. 16A shows a timing for generating the pulse selecting signal S107, FIG. 16B shows a timing for generating the pulse selecting signal S107A, FIG. 16C shows a timing for generating the emission instructing signal S102, FIG. 16D shows a timing for outputting the signal S601 from the AND circuit 66, FIG. 16E shows a timing for outputting the signal S602 from the AND circuit 67, FIG. 16F shows a timing for outputting the signal S602A from the delay element 69, FIG. 16G shows a timing for outputting the signal (active state signal) S603 from the OR circuit 65, FIGS. 16H and 16K show timings for generating the received pulse signal S105, FIG. 16I shows a timing for outputting the signal S604 from the comparator 62, FIG. 16J shows a timing for outputting the signal S605 from the latch circuit 70, FIG. 16L shows a timing for outputting the signal S105A from the delay element 64, and FIG. 16M shows a timing for outputting the signal S106 from the comparator 61.

DESCRIPTION OF THE PREFERRED EMBODIMENTS

In the following, the distance measuring apparatus according to the present invention will be explained with reference to FIGS. 1 to 5, 6A to 6D, 7A to 7D, 8A to 8D, 9A to 9D, 10 to 12, 13A to 13M, 14 and 15, and 16A to 16M. Among the drawings, parts identical to each other will be referred to with numerals or letters identical to each other without repeating their overlapping explanations.

Figure 1:
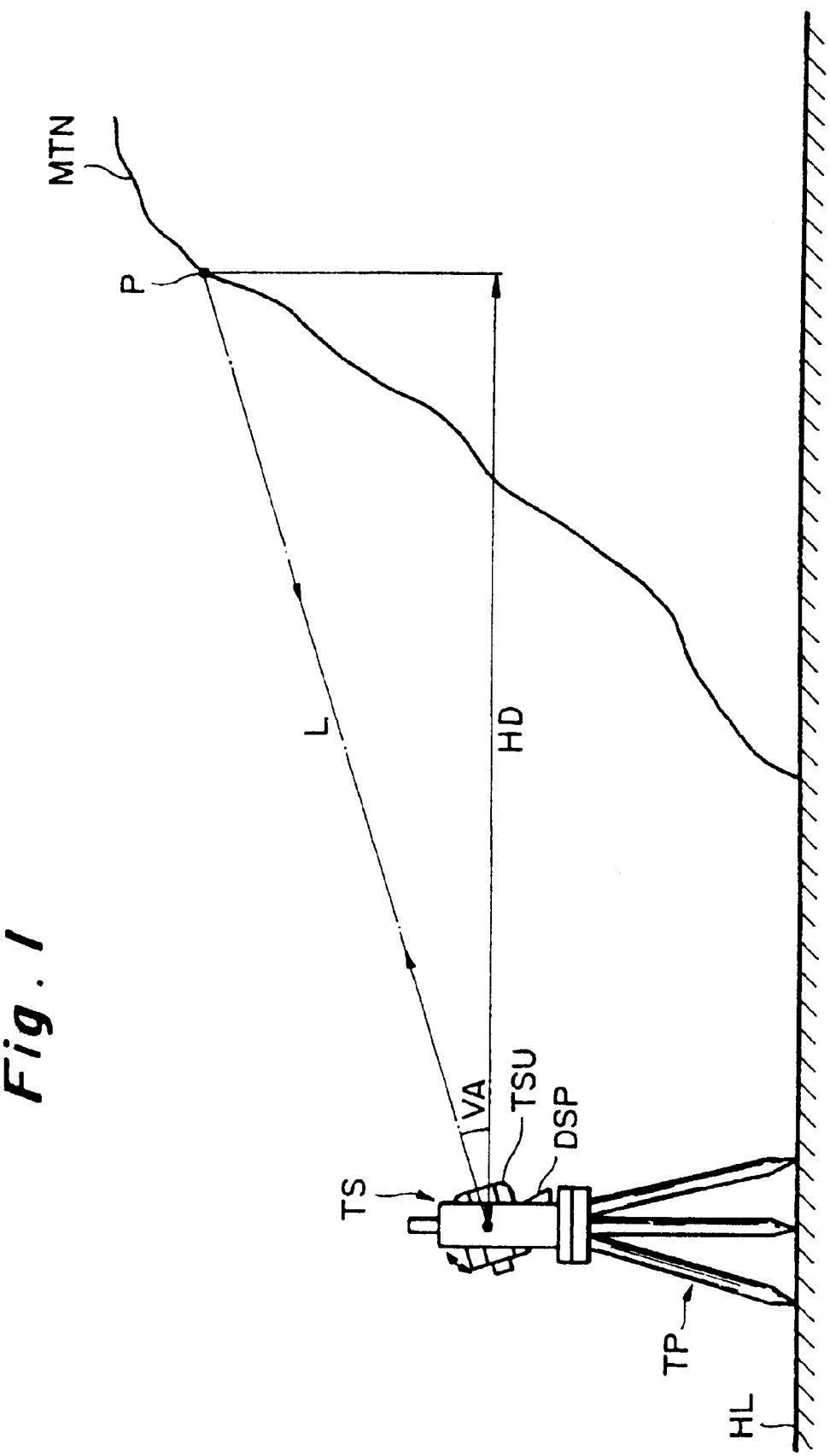
FIG. 1 is a conceptual view for explaining a method of measurement.

FIG. 1 is a conceptual view for explaining a method of measurement. First, in order to carry out measurement, a surveying instrument comprising a distance measuring apparatus TS attached onto a tripod TP is placed on a horizontal ground surface HL. When the ground surface HL is not horizontal, a non-depicted adjustment screw is turned such that the central vertical axis of the distance measuring apparatus TS becomes orthogonal to the horizontal plane. Such an adjustment screw mechanism is disclosed, for example, in U.S. Pat. No. 4,113,381. This surveying instrument measures a horizontal distance HD to a point to be measured P which is located halfway up a mountain MTN.

The distance measuring apparatus TS is a so-called total station also having a theodolite or transit function. The apparatus TS is mounted on the tripod TP so as to be rotatable about the vertical direction with respect to the ground surface, and has a telescope unit TSU which is rotatable about the horizontal direction with respect to the ground surface. Their rotation angles are measured by a rotary encoder as disclosed in the above-mentioned U.S. Pat. No. 4,113,381.

The telescope unit TSU emits measurement pulse light. Of the pulse light, the component reflected at the point to be measured P enters into the telescope unit TSU. Then, according to the period of time 2T between the timing at which the pulse light is emitted and the timing at which its reflected beam (reflected component) is received, and the velocity of light c, the distance L from the telescope unit TSU to the point to be measured P is measured. The horizontal distance HD can be computed from the angle VA formed between the optical axis of the telescope unit TSU and a horizontal line (ground surface) and the distance L, and is obtained by an electronic circuit EC within the apparatus TS (see FIG. 4). Namely, when the correction explained later is not effected within the telescope unit TSU, the distances L and HD become:

$$L = c \times T$$

$$HD = L \times cos VA$$

Here, a prism for reflecting the emitted measurement pulse light may be disposed at the point to be measured P.

The horizontal rotation angle HA and vertical rotation angle VA measured by the rotary encoder of the distance measuring apparatus TS, and the horizontal distance HD obtained by the arithmetic controller are indicated on the display DSP of the distance measuring apparatus TS.

Figure 2:
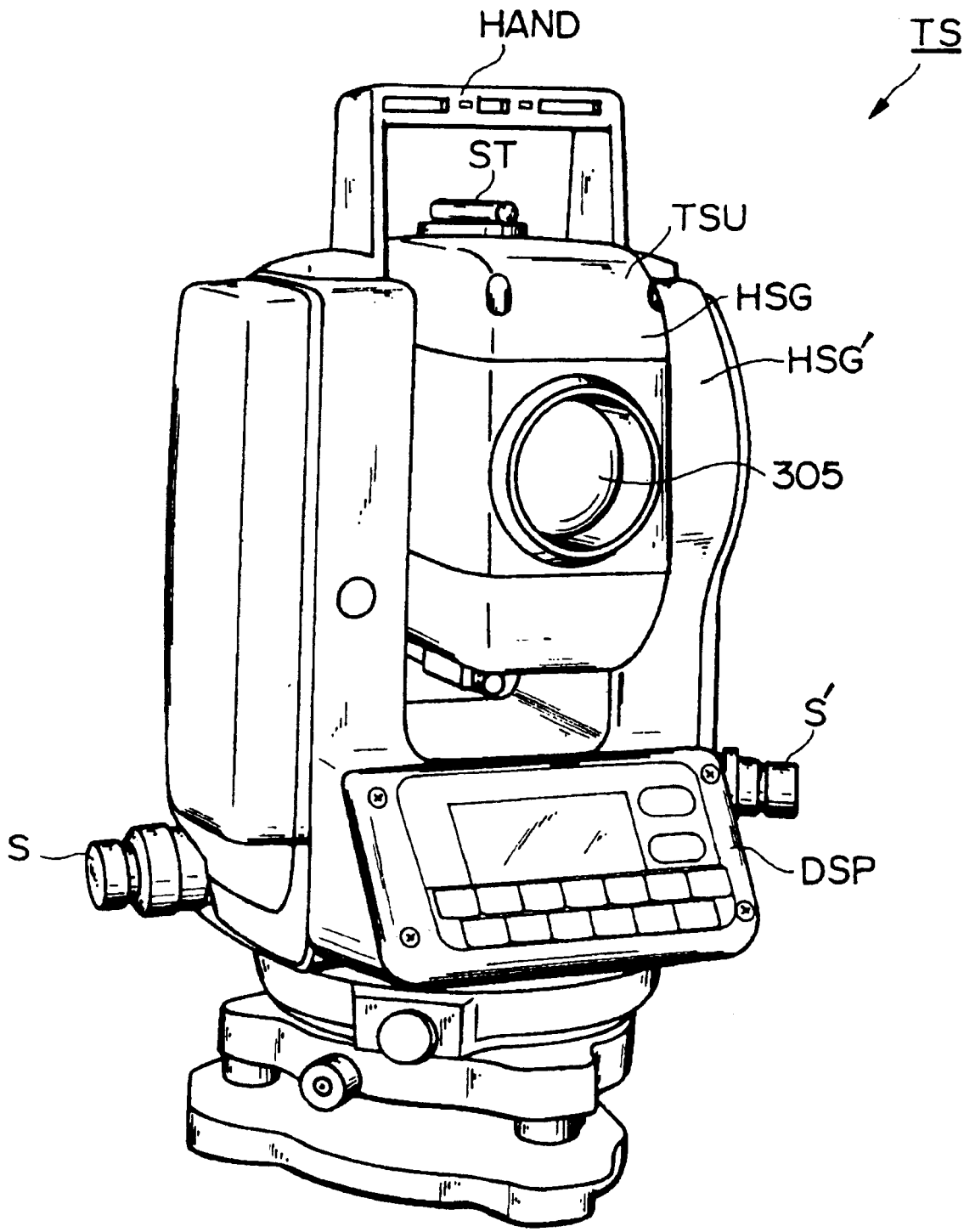
FIG. 2 is a perspective view showing the exterior of a distance measuring apparatus.

FIG. 2 is a perspective view showing the exterior of the distance measuring apparatus. Disposed within a support housing HSG' having substantially a U-like form are a battery and the electronic circuit EC. The telescope unit TSU having an objective lens 305 on its front face includes a rotatable housing HSG, whereas a collimator ST is disposed on the upper face of the housing HSG. Disposed outside the U-shaped housing HSG' are adjustment screws S, S' which are used for changing the posture of the housing HSG'. The rotary housing HSG is disposed between the opposing outer surfaces of the U-shaped housing HSG' and are rotatably supported thereby. Attached to the upper end portion of the U-shaped housing HSG' is a handle HAND. The display DSP is disposed at the proximal end portion of the U-shaped housing HSG'.

Figure 3:
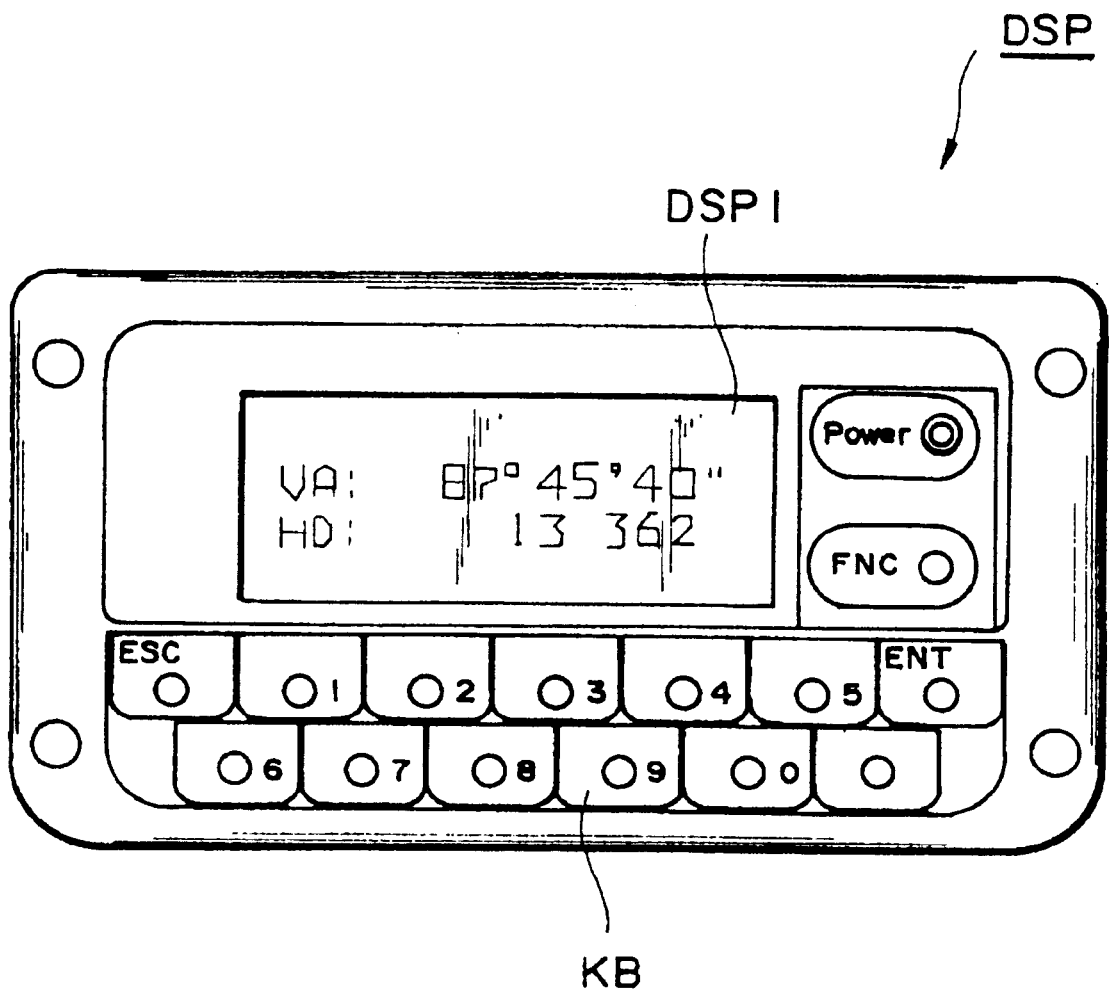
FIG. 3 is a plan view showing a display DSP of the distance measuring apparatus shown in FIG. 2.

FIG. 3 is a plan view showing the display DSP. The display DSP is constituted by a liquid crystal DSP1 and an operation keyboard section KB. The display DSP is electrically connected to the electronic circuit EC within the U-shaped housing HSG' and indicates, on its liquid crystal DSP1, the above-mentioned horizontal rotation angle HA, vertical rotation angle VA, horizontal distance HD, remaining battery power, and the like. The keyboard section KB has a power button for turning power on, function selecting buttons for selecting the starting of distance measurement and the starting of angle measurement, an enter button for determining the selected function, and an escape button for canceling various commands. The operator pushes these buttons when necessary.

FIG. 4 is a block diagram showing a configuration of the distance measuring apparatus according to the present invention. First, a basic measurement operation will be explained. An arithmetic controller 1 is constituted, for example, by a CPU, its peripheral circuits, and the like, and outputs a measurement instructing signal S101 to a signal processor 2. The signal processor 2 is constituted by a counter and the like. In response to the measurement instructing signal S101, the signal processor 2 outputs an emission instructing signal S102 to an emitter 3 and starts counting time. The emission instructing signal S102 is also outputted to a received signal detector 6. Upon receiving the emission instructing signal S102, the received signal detector 6 causes a comparator therein to attain a signal detectable state (active state).

The emitter 3 is constituted by a semiconductor laser driving circuit 31, a semiconductor laser 32 which is a light source, and an emission optical system 33. The emission optical system 33 selectively introduces pulse light 103 into a measurement optical path as measurement pulse light 110 directed toward a target or into a reference optical path as reference pulse light 111, thereby transmitting the pulse light into each optical path.

The pulse light 110a (reflected beam) reflected by the target in the measurement pulse light 110 emitted into the measurement optical path from the emission optical system 33, or the reference pulse light 111 propagated through the reference optical path is received by a receiver 4. The receiver 4 is constituted by a light-receiving optical system 41, an APD (avalanche photodiode) 42 which is a highly sensitive light-receiving device, and an APD driving circuit 43. The pulse light 104 (reference pulse light 111 or reflected beam 110a of the measurement pulse light 110) transmitted through the light-receiving optical system 41 is photoelectrically converted by the APD 42 into an APD output signal S109, which is outputted to a received signal amplifier 5.

The APD output signal S109 is amplified by the received signal amplifier 5 and, as a received pulse signal S105 having a pulse height corresponding to the magnitude of the APD output signal S109, is outputted to a received signal detector 6. When receiving a received pulse signal S105 which is not smaller than a predetermined threshold level TL, the received signal detector 6 generates, from the received pulse signal S105, a receive timing signal S106 for terminating the time measurement and outputs thus generated signal to the signal processor 2.

The arithmetic controller 1 outputs a pulse selecting signal S107 to the received signal detector 6 and instructs whether to delay the activation of the comparator within the received signal detector 6 or not. Namely, when the pulse selecting signal S107 is at its high level "H" the activation is not delayed, thereby the received signal detector 6 attains an active state at the same moment when the emission instructing signal S102 is outputted. By contrast, when the pulse selecting signal S107 is at its low level "L" the activation of the comparator is delayed by a predetermined period of time, thereby the pulse selecting signal S107 becomes the high level "H" after a predetermined period of time has elapsed since the outputting of the emission instructing signal S102.

Upon receiving the receive timing signal S106, the signal processor 2 terminates the time measurement, and acquires the time data extending from the emission instructing signal S102 to the receive timing signal S106. Thus obtained time data are transferred to the arithmetic controller 1 as a signal S112, which is turned into distance data with reference to the velocity of light. Here, the time at which the pulse light (measurement pulse light 110 or reference pulse light 111) is emitted refers to the output timing for the emission instructing signal S102, whereas the time at which the pulse light (measurement pulse light 110 or reference pulse light 111) is received refers to the input timing for the receive timing signal S106.

Also, a limit switch 330 is provided for detecting whether the target is farther than a predetermined value or not. Namely, when a focusing lens 306, which will be explained later, is moved to the farther distance side (toward the objective lens 305) in order to focus onto a target farther than the predetermined value, the limit switch 330 detects that the focusing lens 306 is farther than the predetermined value, and outputs a detection signal S108 to the arithmetic controller 1.

FIG. 5 is a block diagram showing a configuration of an optical system in the distance measuring apparatus according to the present invention. The pulse light emitted from the semiconductor laser 32, which is a light source, is turned into a parallel luminous flux by a collimator lens 301 and then is made incident on a prism 302. The prism 302 has, for example, a ratio of transmissivity T with respect to reflectivity R of $T/R = 1/99$, thereby greatly attenuating the pulse light transmitted to the reference optical path 350.

The case where the reference optical path is selected by the arithmetic controller 1 (see FIG. 4) will now be explained. The arithmetic controller 1 sets a reference optical path opening state and a measurement optical path closing state by means of an optical path switching shutter 321 (indicated by solid line in FIG. 5) which is an optical path selecting means (switching mechanism).

The pulse light transmitted through the prism 302 is reflected by a mirror 312. Thus reflected pulse light is attenuated to a predetermined level by a filter 313 which has already been set at the time of assembling and adjustment, and is transmitted therethrough. The pulse light transmitted through the filter 313 is then transmitted through a light quantity adjustment filter 314. Usually, the light quantity for the reference optical path is not attenuated. The light quantity adjustment filter 314 is set such as to reduce the signal level of the reference optical path only when the signal level of the measurement optical path is smaller than that of the reference optical path.

Subsequently, the pulse light transmitted through the light quantity adjustment filter 314 is reflected by a mirror 315. Thus reflected pulse light is transmitted through the optical path switching shutter 321 set to the reference optical path opening state, thereby becoming incident on a prism 310. This prism 310 has a characteristic equivalent to that of the prism 302. The pulse light transmitted through the prism 310 is made incident on the APD 42, which is a light-receiving device, by way of a collimator lens 311.

The reference optical path traveling only within the apparatus is installed for the purpose of correcting the fluctuation in delay time caused by changes in temperature of the received signal detector 6 and the like so as to enhance the accuracy in measurement and the purpose of making the reference point of distance measurement, when set on a measurement point of the apparatus, coincide with the mechanical center point positioned on a plumb line passing this measurement point.

The case where the measurement optical path is selected by the arithmetic controller 1 will now be explained. The arithmetic controller 1 sets a measurement optical path opening state and a reference optical path closing state by means of an optical path switching shutter 321a (indicated by dashed line in FIG. 5) which is an optical path selecting means (switching mechanism).

The pulse light reflected by the prism 302 is transmitted through a collimator lens 303 and then is reflected by a dichroic mirror 304. The dichroic mirror 304 has such a characteristic to reflect infrared light and transmit therethrough visible light. The pulse light 351 (measurement pulse light 110) reflected by the dichroic mirror 304 is transmitted through the objective lens 305, thereby being emitted toward the target.

The reflected beam 352 (reflected beam 110a of the measurement pulse light 110) is collected by the objective lens 305. The pulse light (reflected beam 352) collected by the objective lens 305 is transmitted through the focusing lens 306, and is reflected by a dichroic mirror 307, thereby becoming incident on an optical fiber 308. Here, 308a indicates the entrance end face of the optical fiber 308.

The pulse light propagated through the optical fiber 308 is turned into a parallel luminous flux by a collimator lens 309, and is attenuated to a predetermined amount through the light quantity adjustment filter 314 driven by a light quantity adjustment filter driving motor 322, thereby becoming incident on the prism 310. Since the optical path switching filter 321a is set to the measurement optical path opening state at the time of selecting the optical path, the pulse light reflected by the prism is made incident on the APD 42, which is a light-receiving element, with the aid of the collimator lens 311.

When the above-mentioned high-power pulse light is transmitted to the measurement optical path, there is, for example, light reflected by an inner face 305a of the objective lens 305 so as to be made incident on the optical fiber 308 by way of the dichroic mirror 307. Also, an unnecessary reflected beam occurs at the entrance end face 308a of the optical fiber 308. Such a reflected beam is flare, which results in an error in measurement of the measurement optical path as mentioned above.

The flare and reflected pulse light 352 emitted out of the optical fiber 308 enter the APD 42, which is a light-receiving device, with a time difference in proportion to the distance to the objective lens 305 or distance to the target with respect to the measurement pulse light 351 emitted into the measurement optical path.

Before starting the measurement, the focusing lens 306 is moved along the directions of D in the drawing while the target is being observed through a collimation optical system with an eye 319 of the measurer, thereby the target is brought into focus. The collimation optical system is constituted by an eyepiece 318, a reticle (focusing screen) 317, an erect prism (Porro prism), the focusing lens (anallatic lens) 306, and the objective lens 305. The limit switch 330 detects whether the target is placed at a position farther than a predetermined value or not by detecting the movement of the focusing lens 306 to the side farther than a predetermined position (toward the objective lens 305).

FIGS. 6A to 6D are views for explaining a distance measuring method utilizing pulse light. FIGS. 6A and 6B show a relationship between the emission instructing signal S102 and the receive timing signal S106 in the case where the reference pulse light 111 is propagated through the reference optical path. FIGS. 6C and 6D show a relationship between the emission instructing signal S102 and the receive timing signal S106 in the case where the measurement pulse light 110 is propagated through the measurement optical path.

The reference optical path is disposed within the apparatus. The reference pulse light 111 is emitted from the emitter 3 shown in FIG. 4, and reaches the receiver 4 by way of the reference optical path. As mentioned above, the signal processor 2 measures the period of time between the emission instructing signal S102 shown in FIG. 6A and the receive timing signal S106 shown in FIG. 6B, and the arithmetic controller 1 determines, from thus measured period of time and the velocity of light, a measured length $L_{ref}$ (optical path length) of the reference optical path.

On the other hand, the emitter 3 emits the measurement pulse light 110 into the measurement optical path toward the target, and the reflected beam 110a reflected by the target reaches the receiver 4. Subsequently, from the emission instructing signal S102 shown in FIG. 6C and the receive timing signal S106 shown in FIG. 6D, in a manner similar to that mentioned above, a measured length $L_s$, (optical path length) of the measurement optical path is determined. Then, on the basis of the difference between the measured length $L_s$, and the measured length $L_{ref}$, the distance from the apparatus to the target is determined.

In general, the electronic circuit has a delay characteristic depending on temperature and the like. Therefore, the measured length $L_{ref}$ of the reference optical path having a known length is subtracted from the measured length $L_s$ of the measurement optical path, thereby canceling the error in delay caused by temperature and the like.

Measured in the time measurement in the measurement optical path is the period of time between the emission instructing signal S102 shown in FIG. 6C and the receive timing signal S106, shown in FIG. 6D, indicating that the received signal detector 6 has received a pulse signal which is not smaller than a threshold level.

Meanwhile, when flare is made incident on the light-receiving device 42 as relatively strong pulse light, the receive timing signal S106 indicated by dashed line in FIG. 6D is generated by the flare, thereby an erroneous measured length $L_s$ is determined.

In addition, the pulse signal caused by flare does not always have a magnitude as high as the threshold level detected by the received signal detector 6. Therefore, before the distance measurement, light quantity adjustment is effected in order that the received light quantity of the reflected beam 110a propagated through the measurement optical path and the received light quantity of the reference pulse light 111 propagated through the reference optical path have levels equivalent to each other. In the case where the light quantity of the reflected beam 110a is small due to the fact that the distance from the apparatus to the target is large and so forth, the reflected beam 110a is not attenuated even when the light quantity adjustment is effected. As a consequence, flare is not attenuated, thus allowing the received signal detector 6 to detect the pulse signal caused by the flare.

By contrast, in the case where the light quantity of the reflected beam 110a is large due to the fact that the distance from the apparatus to the target is small and so forth, the reflected beam 110a is attenuated by the light quantity adjustment. Here, the flare may be attenuated similarly, thereby the received signal detector 6 may fail to detect the pulse signal caused by the flare.

Here, the light quantity adjustment is effected before the distance measurement since the delay characteristic of the electronic circuit generally differs depending on the power of the signal fed therein. The light quantity adjustment filter 314 effects the light quantity adjustment such that the reference pulse light 111 received by way of the reference optical path and the reflected beam 110a of the measurement pulse light 110 received by way of the measurement optical path are equal in power.

In the conventional example mentioned above, the structure of the optical system is improved so as to eliminate the flare itself. As a result, however, the received light quantity decreases, thus failing to increase the measurable distance.

Hence, in this embodiment, the error in measurement caused by flare is overcome by signal processing. Namely, a pulse light source capable of outputting a large peak power is employed, so as to allow the measurable range to increase and the non-prism measuring ability to improve. On the other hand, influences of the resultant flare, which may cause a large error in measurement, are eliminated as explained in the following. Here, when the reference pulse light 111 from the emitter 3 is made incident on the receiver 4 by way of the reference optical path, there is no flare caused by the reflection from the objective lens 305 or the like.

In the case where the measurement pulse light 110 from the emitter 3 is propagated through the measurement optical path, and then the reflected beam 110a thereof is made incident on the receiver 4 by way of the measurement optical path, the flare caused by the reflection of the objective lens 305 or the like is also received by the receiver 4. In the following, influences of the flare will be explained in two cases, i.e., the cases where the target is near and far, respectively.

Case with Short Distance between Apparatus and Target (Case 1)

In Case 1, the light quantity of the reflected beam 110a received after being propagated through the measurement optical path is greater than the light quantity of the reference pulse light 111 received after being propagated through the reference optical path. It corresponds to the case where the target is relatively near.

In this case, in order to match the light quantity of the reflected beam 110a received after being propagated through the measurement optical path to the light quantity of the reference pulse light 111 received after being propagated through the reference optical path, the light quantity adjustment filter 314 attenuates the light quantity of the reflected beam 110a. At the same time, flare is attenuated, thereby the pulse signal caused by the flare is suppressed to a level which is not detected by the received signal detector 6.

Figure 7A:
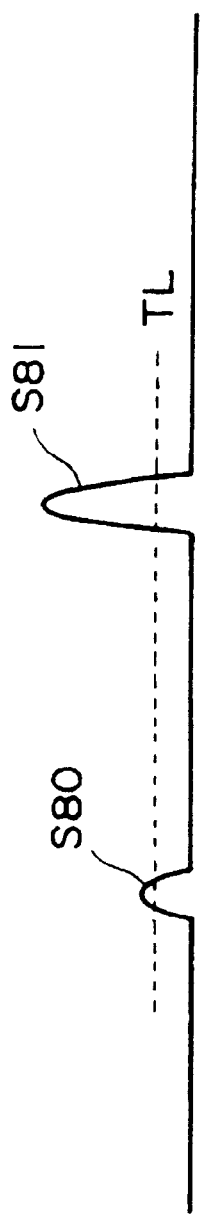

FIGS. 7A to 7D are timing charts showing timings for generating signals in the case where the distance between the apparatus and the target is short. FIG. 7A shows a timing for generating a received pulse signal S105 before light quantity adjustment. Since the target is near, the reflected pulse signal S81 caused by the reflected beam from the target has a peak level higher than the flare pulse signal S80 caused by flare, with both signals S80 and S81 exceeding the threshold level TL.

Figure 7B:
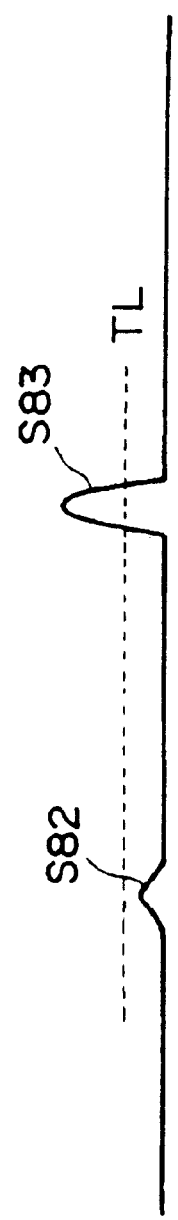

FIG. 7B shows the received pulse signal S105 after the light quantity adjustment. The light quantity adjustment is effected such that the light quantity of the reflected pulse light 110a from the target corresponding to the maximum peak level of the received pulse signal S105 equals the light quantity of the reference pulse light 111 propagated through the reference optical path. In addition, the reference pulse light 111 is attenuated by the filter so as to become about the same as the light quantity of the reflected pulse light from the target located at a long distance. As a consequence, the reflected pulse signal S81 is suppressed to the level of the reflected pulse signal S83 in FIG. 7B. At this time, the flare pulse signal S80 is similarly suppressed to the level of the flare pulse signal S82, with its peak level not exceeding the threshold level TL.

Figure 7C:
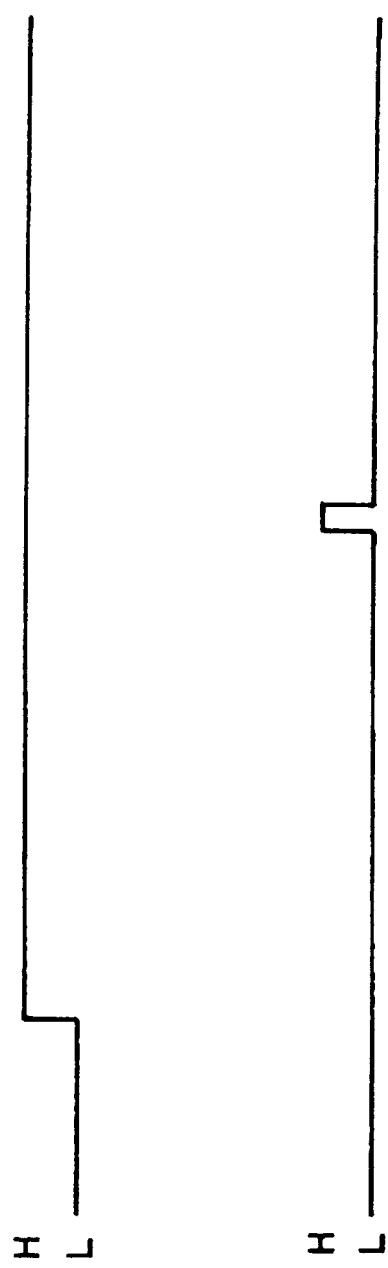

FIG. 7C shows an active state signal indicative of whether the received signal detector 6 is in an active state or not. As explained with reference to FIG. 4, in response to the emission instructing signal S102, the active state signal attains its high level "H" thereby activating the received signal detector 6. When the received pulse signal S105 exceeding the threshold level TL is inputted, the activated received signal detector 6 generates a receive timing signal S106.

Figure 7D:

In the above-mentioned case, though the flare pulse signal S82 also exists as the received pulse signal S105, it is reduced as mentioned above, thereby failing to reach the above-mentioned threshold level TL. Hence, as shown in FIG. 7D, the receive timing signal S106 is generated only in response to the reflected pulse signal S83.

Consequently, the distance computed by the arithmetic controller 1 coincides with the distance to the target. Though flare is received, there is no error in distance measurement generated by the flare.

Case with Long Distance between Apparatus and Target (Case 2)

In Case 2, the light quantity of the reflected beam 110a received after being propagated through the measurement optical path is equal to or less than the light quantity of the reference pulse light 111 received after being propagated through the reference optical path. Namely, it corresponds to the case where the target is far. In this case, even when the light quantity adjusting means causes the light quantity of the reflected beam 110a to coincide with the light quantity of the reference pulse light 111, the pulse signal caused by flare is detected by the received signal detector 6.

Figure 8A:
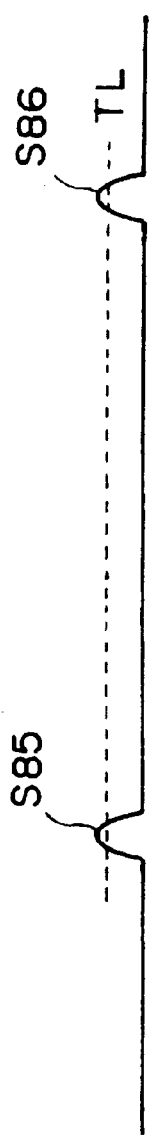

FIGS. 8A to 8D are timing charts showing timings for generating signals in the case where the distance between the apparatus and the target is long. As with FIG. 7A, FIG. 8A shows the received pulse signal S105 before light quantity adjustment. Since the target is far, the reflected pulse signal from the target has a low signal level, which is about the same as that of the flare pulse signal S85.

Figure 8B:
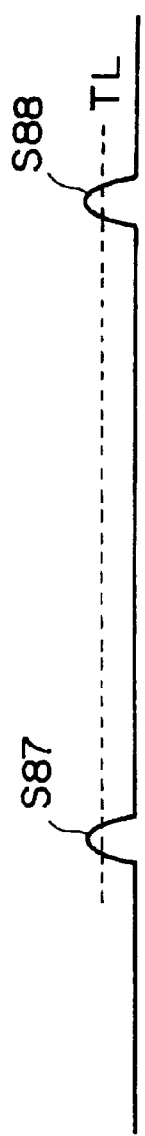

FIG. 8B shows the received pulse signal S105 after the light quantity adjustment. The reflected pulse signal S86 in FIG. 8A is originally at a low level, which is close to the level of the received signal from the reference optical path including the prism 302 for attenuating the pulse light from the semiconductor laser 32 and the filter 313. Hence, the received light quantity is regulated only slightly upon the light quantity adjustment. As a consequence, the magnitude of the flare pulse signal S87 hardly changes, thus remaining at a level which is about the same as that of the reflected pulse signal S88.

Figure 8C:
Figure 8D:

FIG. 8D shows the receive timing signal S106. In this case, since the flare pulse signal S87 has a magnitude which is about the same as that of the reflected pulse signal S88, the receive timing signal S106 also generates a receive timing signal S89 at the timing of the flare pulse signal S87. FIG. 8C shows an active state of the received signal detector 6.

The arithmetic controller 1 effects time measurement according to the receive timing signal S89 that is initially detected. As a result, the time measured for the measurement optical path substantially equals the time measured for the reference optical path, thereby the measured length value L computed on the basis of thus measured time becomes a very short length, e.g., less than 1 m. It is due to the fact that flare is generated in the objective lens or the like within the apparatus, whereas the optical path length within the apparatus is less than 1 m in general. This measured length of 1 m will be referred to as a reference value.

Hence, in this embodiment, in the case where the measured length value level L becomes less than the reference value of 1 m as a result of computing, or the case where the measured time is not greater than a value at which the measured length value L is 1 m, the arithmetic controller 1 delays for a predetermined period of time the timing for activating the received signal detector 6.

In another embodiment, when the limit switch 330 detects that the target to be focused on by the focusing optical system is farther than a predetermined value, the arithmetic controller 1 delays for a predetermined period of time the timing for activating the received signal detector 6.

FIGS. 9A to 9D show timing charts when the timing for activating the received signal detector 6 is delayed by a predetermined term tl in the case where the distance between the apparatus and the target is long. Namely, it is an embodiment in which the receive timing signal generated by flare is ignored.

Figure 9A:
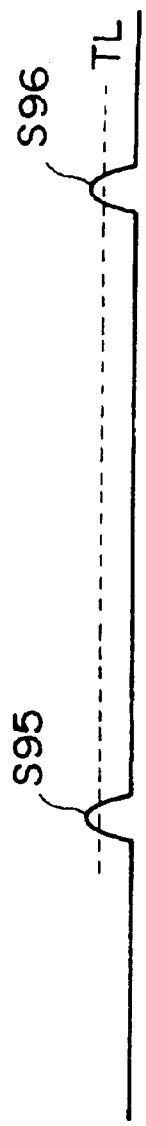
Figure 9B:
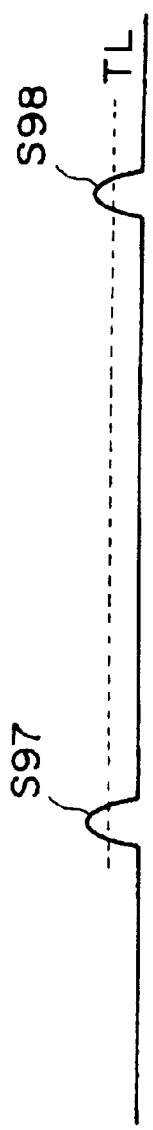
Figure 9C:
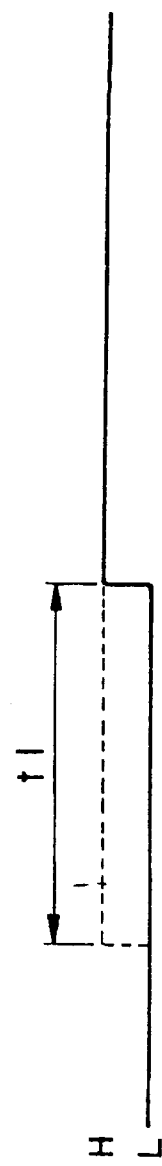
Figure 9D:

FIGS. 9A and 9B are similar to FIGS. 8A and 8B. A flare pulse signal S97 exists in FIG. 9B without being attenuated. The active state signal of the received signal detector 6 in FIG. 9C is set to its high level "H" with a delay of the predetermined term tl. As a consequence, the receive timing signal S106 would not be generated in response to the flare pulse signal S97. The receive timing signal S106 is generated, as a pulse signal S99, only at the timing for generating a reflected pulse signal S98 based on the reflected beam from the target.

Figure 10:
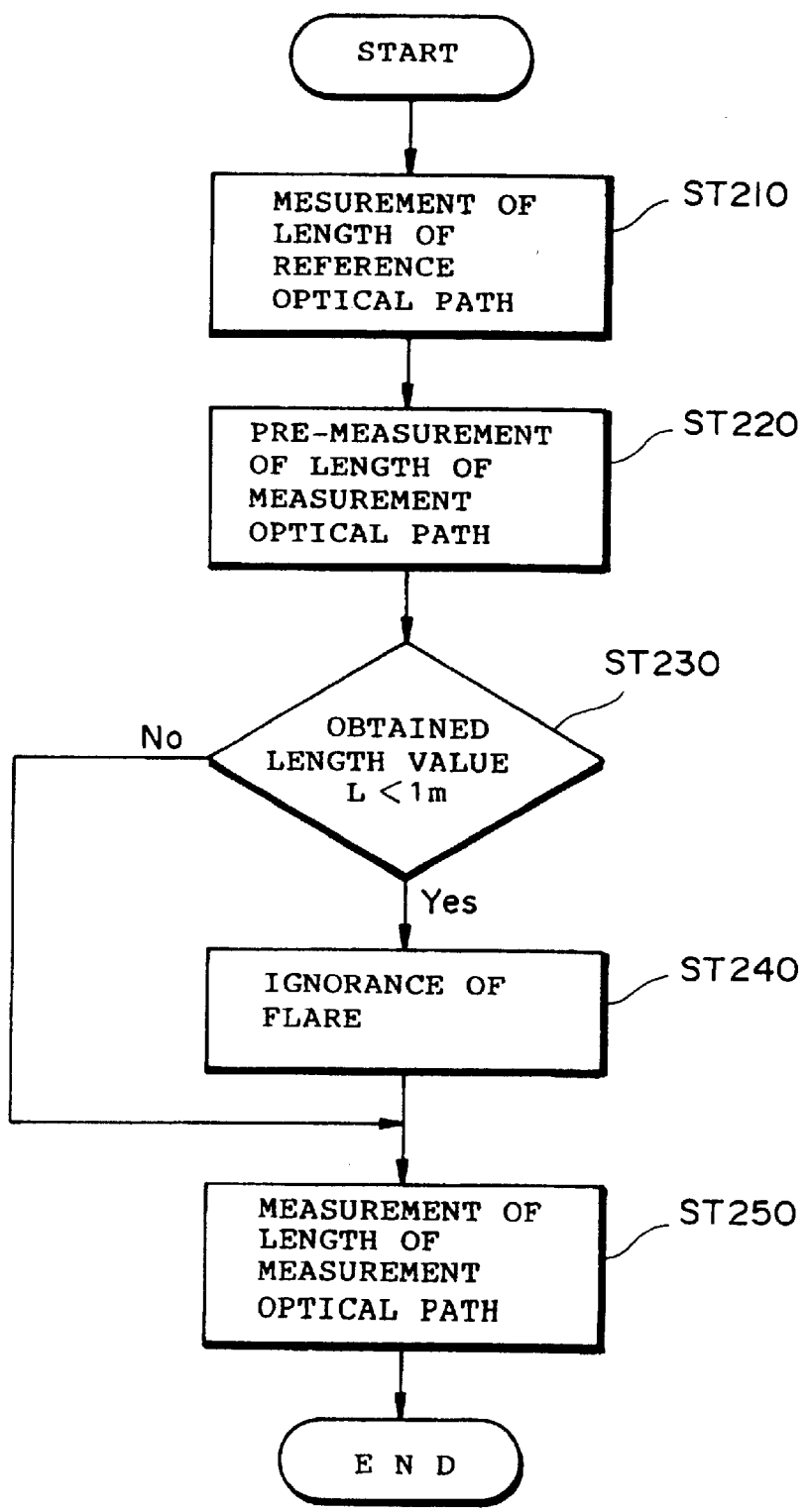
FIG. 10 is a flowchart for explaining a pre-measurement operation in the distance measuring apparatus according to the present invention.

In the following, distance measuring operations according to embodiments (distance measuring method according to the present invention) will be explained with reference to flowcharts. FIG. 10 shows a schematic flowchart in the case where whether to ignore signals caused by flare or not is judged on the basis of the measured length value obtained upon pre-measurement which is a preliminary distance measurement operation.

When measurement is started, the reference optical path is initially measured (step ST210). As a consequence, the optical path length $L_{ref}$ of the reference optical path is determined. $L_{ref}$ is usually less than 1 m.

Then, the optical path is switched to a measurement optical path, thereby pre-measurement for preliminarily measuring the optical path length of the measurement optical path is effected (step ST220). Then, according to whether the resulting measured length L is, for example, shorter than 1 m or not, it is judged whether to ignore flare or not (step ST230). If the measured length value L determined by the pre-measurement is less than 1 m, then the signal caused by the flare is ignored (step ST240). If the measured length value L is 1 m or longer, then the processing of step ST240 is not effected. The signal caused by the flare is ignored by delaying the active state signal of the received signal detector 6 for tl as mentioned above.

After it is judged whether to ignore the signal caused by the flare or not, a main measurement operation for the measurement optical path is effected (step ST250). As a consequence, in the main measurement operation, even when flare exists, the signal caused by the flare is ignored, thereby measurement is effected on the basis of the reflected pulse light 110a from the target.

Figure 11:
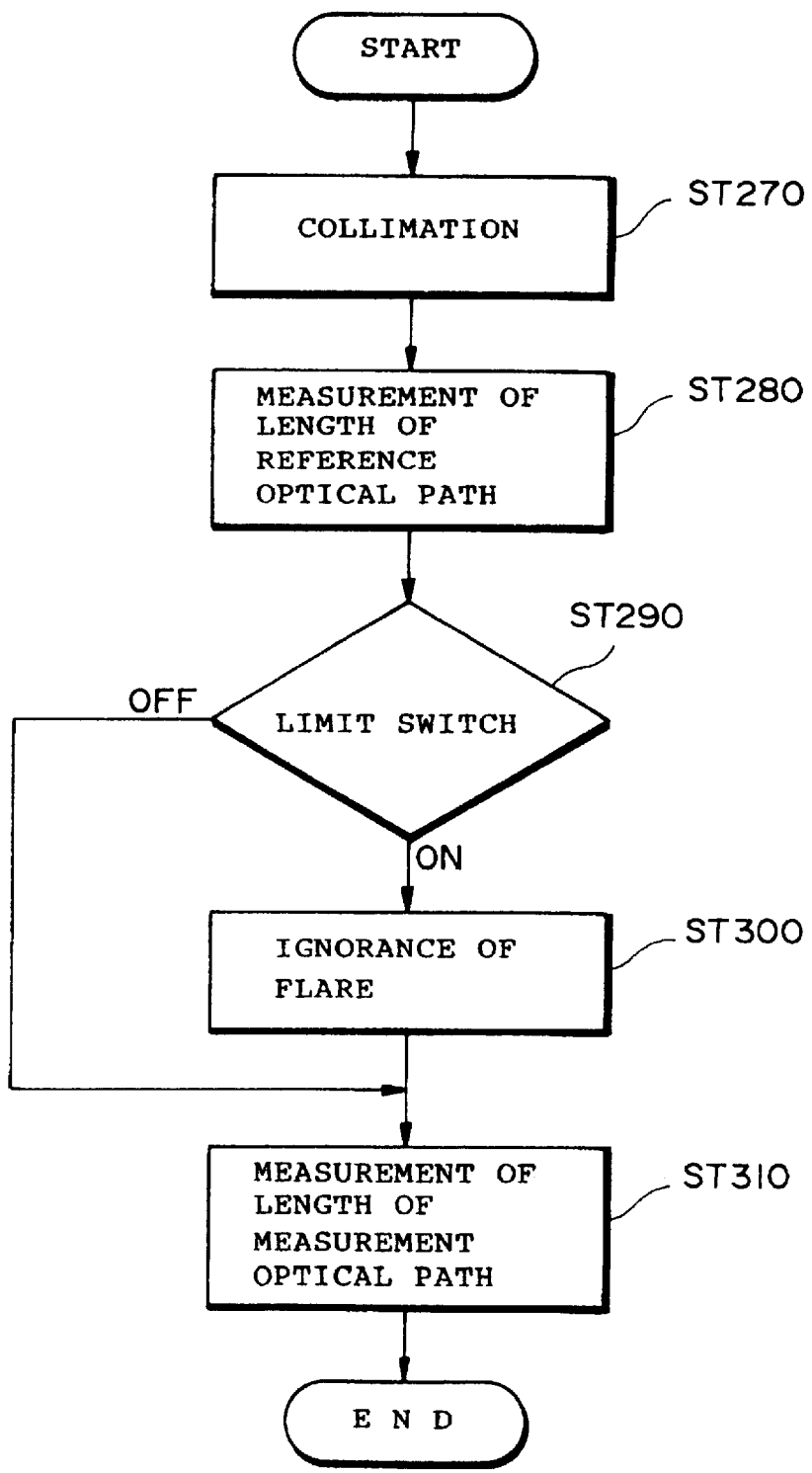
FIG. 11 is a flowchart for explaining a measurement operation utilizing a limit switch.

FIG. 11 shows a schematic flowchart in the case where whether the target is far or near is judged by means of the limit switch 330, and then distance measurement is effected. This case is substantially the same as that of FIG. 10 except that collimation which will be explained later is effected (step ST270) prior to measurement of the reference optical path (step ST280), thereby judging whether the target is located farther or nearer than a predetermined position. The collimation is an operation for adjusting the position of the focusing lens along the optical axis, thereby forming an image of the target onto the reticle 317. The limit switch 330 is disposed near the focusing lens as shown in FIG. 5, and whether the target is far or near is judged on the basis of the position of the focusing lens (step ST290).

In the case where the target is far, flare would not be attenuated upon light quantity adjustment. Therefore, the active state signal of the received signal detector 6 is delayed so that the signal caused by the flare can be ignored (step ST300). When the target is near, since flare is attenuated upon light quantity adjustment, the signal caused by the flare is not ignored. As with the case of FIG. 10, the length is thereafter measured in the measurement optical path (step ST310).

Thus, even in the case where flare is not attenuated, the received signal detector 6 is activated later than the timing at which the flare is received. Hence, the distance to the target can be computed without being influenced by flare. Namely, no error would occur in the measured length value due to flare.

Figure 12:
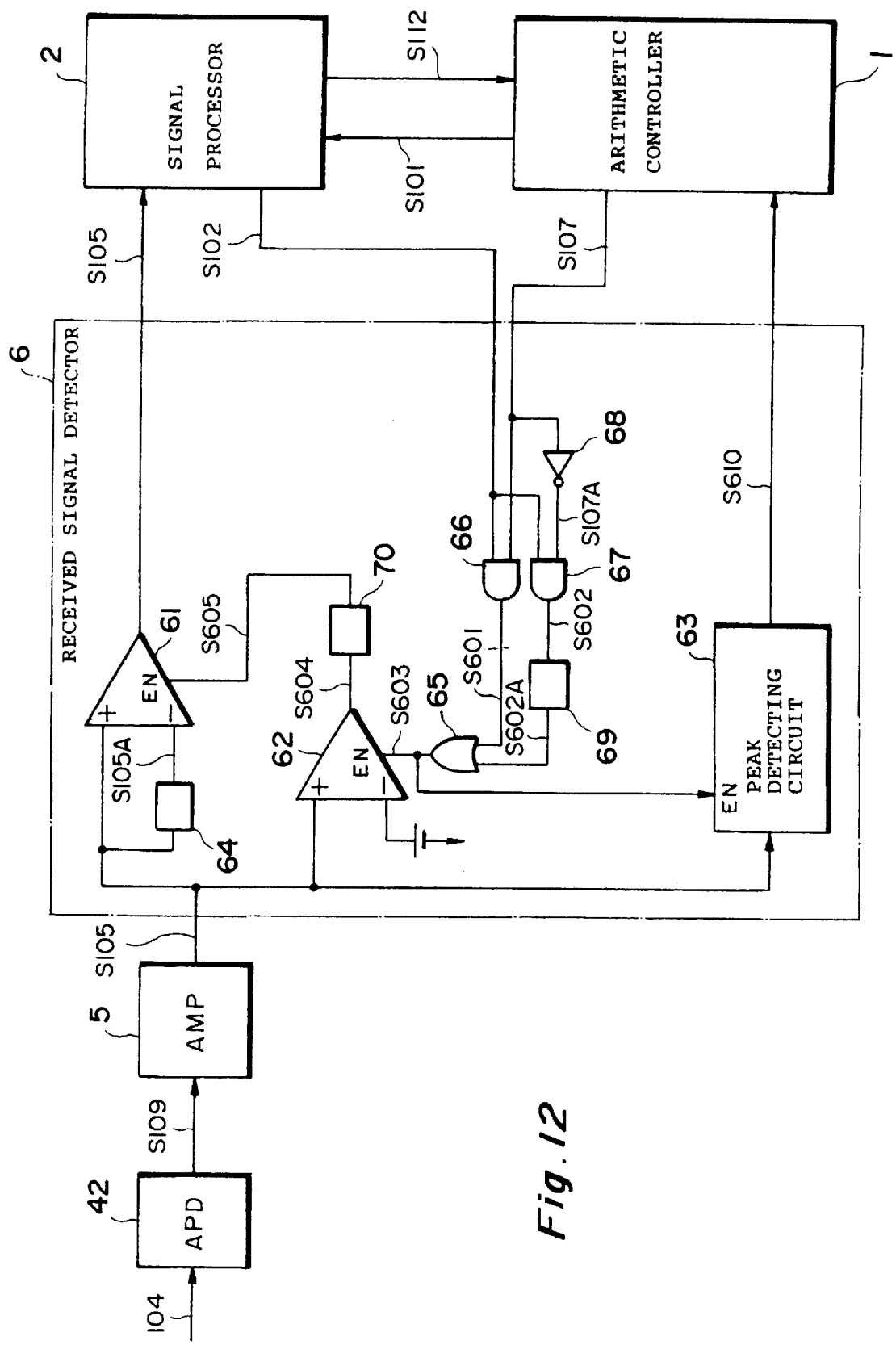
FIG. 12 is a view showing a configuration of a received signal detector in the distance measuring apparatus shown in FIG. 4.
Figure 13A:
Figure 13B:
Figure 13C:
Figure 13D:
Figure 13E:
Figure 13F:

FIG. 12 is a block diagram showing a configuration of the received signal detector 6 according to an embodiment of the present invention. FIGS. 13A to 13M show timing charts for measurement in a reference optical path and a measurement optical path which is free from influences of flare. FIG. 14 is a flowchart for explaining measurement operations for pre-measurement in this embodiment. With reference to these drawings, measurement operations in this embodiment of the present invention free from influences of flare will be explained in more detail.

First, the reference optical path is selected. This operation corresponds to steps ST211 to ST213 in the measurement flowchart of FIG. 14. In the reference optical path set at step ST211, the reference pulse light 111 does not travel through the objective lens 305, thereby no flare occurs. When selecting the reference optical path, the CPU of the arithmetic controller 1 sets the pulse selecting signal 107 (FIG. 13A) to its high level "H" (step ST212). Here, when the emission instructing signal S102 (FIG. 13C) of the signal processor 2 becomes its high level "H," the output signal S601 (FIG. 13D) of the AND circuit 66 and, subsequently, the output signal S603 (FIG. 13G) of the OR circuit 65 attain their high levels "H," thus placing the comparator 62 into an operable state. FIGS. 13A to 13G show timing charts for these operations. FIGS. 13B and 13F show signals S107A and S602A, respectively.

Figure 13G:
Figure 13H:
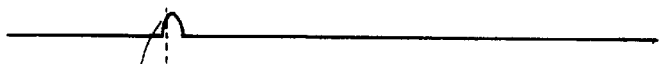
Figure 14:
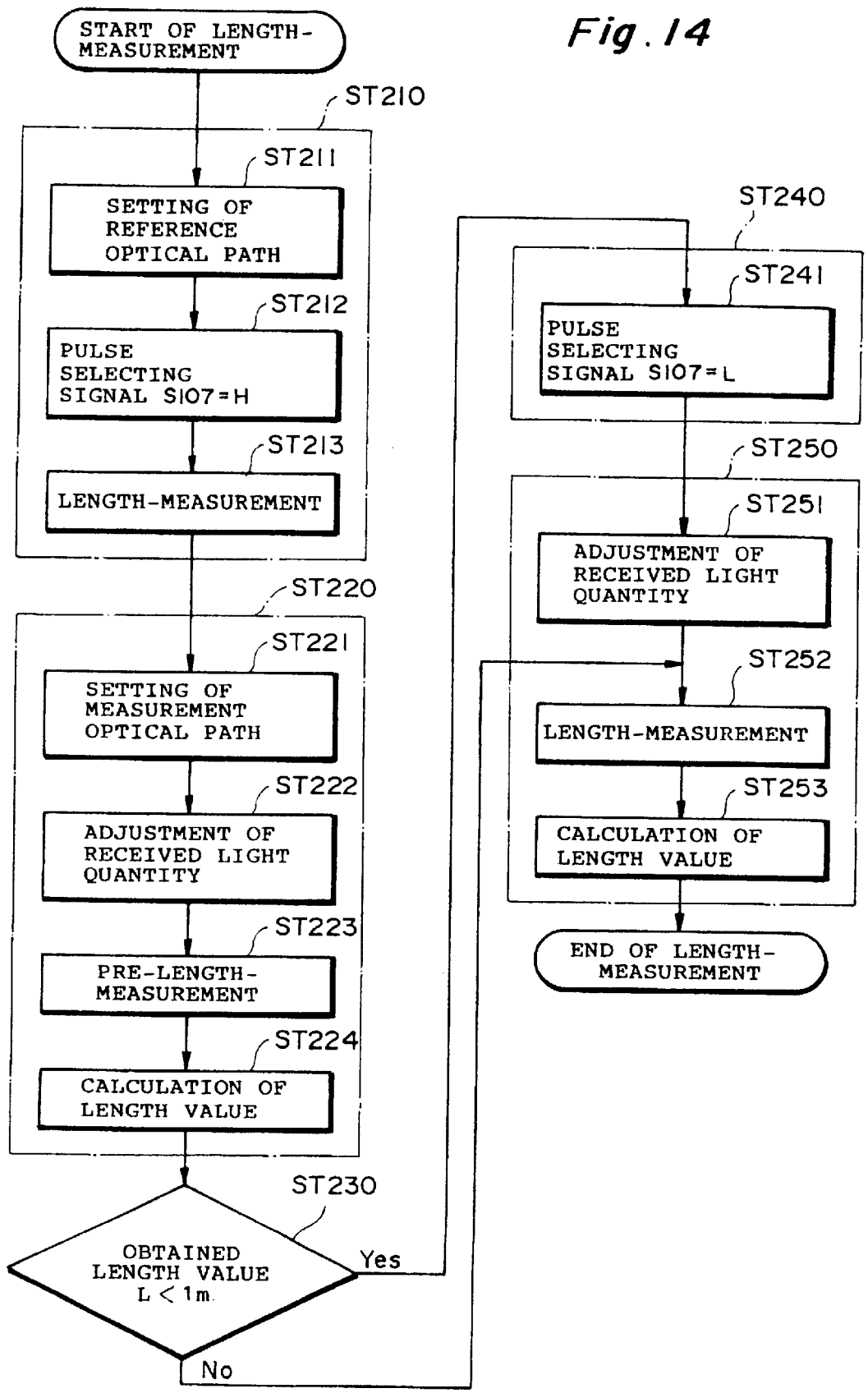
FIG. 14 is a flowchart for more specifically explaining the measurement operation shown in the flowchart of FIG. 10.

The output S603 of the OR circuit 65 in FIG. 13G is the active state signal of the received signal detector 6 mentioned above. When the pulse selecting signal S107 in FIG. 13A is at its high level "H," the active state signal S603 in FIG. 13G attains its high level "H" together with the emission instructing signal S102 in FIG. 13C.

In the measurement at step ST213, the pulse light 104 (reference pulse light 111) received after being propagated through the reference optical path is photoelectrically converted by the APD 42, and the resulting signal is fed into the received signal amplifier 5. The received pulse signal S105 (FIG. 13H) outputted from the received signal amplifier 5 is fed to the non-inverting input terminal of the comparator 62. The inverting input terminal of the comparator 62 has been set to a predetermined level beforehand. Its purpose is to prevent erroneous operations from occurring due to circuit noise and the like.

Figure 13I:
Figure 13J:
Figure 13K:
Figure 13L:
Figure 13M:

When the received pulse signal S105 at the above-mentioned predetermined level or higher is inputted, the comparator 62 outputs a pulse signal S604 (FIG. 13I). At the rising edge of the pulse signal S604, the latch circuit 70 latches the pulse signal S604, and the output S605 (FIG. 13J) of the latch circuit 70 allows a comparator 61, which is a receive timing determining means, to operate. The received pulse signal S105 (FIG. 13K) is fed to the non-inverting input terminal of the comparator 61, whereas the signal S105A (FIG. 13L) obtained when a delay element 64 having a predetermined delay amount delays the received pulse signal S105 is fed to the inverting input terminal.

As a consequence, the output of the comparator 61 becomes a pulse signal S106 (FIG. 13H) which attains its high level "H" at the rising part of the received pulse signal S105 and its low level "L" at the crossing point between the received pulse signal S105 and the delayed signal S105A, and is transmitted to the signal processor 2. The signal processor 2 detects the falling edge of the pulse signal S106. As a result, the measured value $L_{ref}$ in the reference optical path is determined (step ST213). FIGS. 13H to 13M show the timings for the foregoing operations.

Also, the CPU of the arithmetic controller 1 detects the peak level of the received pulse signal S105 by means of a peak detecting circuit 63 within the received signal detector 6. It is necessary for controlling the light quantity adjustment filter driving motor 322 used for driving the light quantity adjustment filter 314.

Then, the measurement optical path is selected. Here, while the pulse selecting signal S107 is kept at its high level "H" the measurement optical path is set (step ST221 in FIG. 14). Then, a light quantity adjustment operation is effected (step ST222), and pre-measurement is performed (steps ST223 and ST224).

Case with Short Distance between Apparatus and Target

In the case where the distance between the apparatus and the target is short, the light quantity of the reflected beam 110a from the target is so large that the output of the peak detecting circuit 63 is at the level of the reflected beam 110a. As a consequence, the light quantity adjustment filter 314 moves to the denser side upon light quantity adjustment, thereby flare is attenuated together with the signal light. Hence, there is no substantial influence of the flare.

Consequently, the result L of the measurement value calculation (step ST224) concerning the pre-measurement (step ST223) becomes the optical length of the measurement optical path, thereby the measured value L is 1 m or longer. Therefore, the active stage signal is not delayed for ignoring the signal caused by flare, and the flow shifts to main measurement (step ST252).

Case with Long Distance between Apparatus and Target

In the case where the distance between the apparatus and the target is long, the reflected beam 110a from the target has a small light quantity, thereby the output of the peak detecting circuit 63 is at the level of the signal caused by flare. As a consequence, the light quantity adjustment filter 314 hardly moves upon light quantity adjustment, thereby time measurement is effected with the signal caused by flare.

When the length L calculated as a result of the pre-measurement is less than 1 m, the optical path length measured for the measurement optical path substantially equals the optical path length measured for the reference optical path, thereby the measurement is judged to be effected with flare (step ST230). Then, the pulse selecting signal S107 is set to its low level "L" (step ST241), a light quantity adjustment operation is effected (step ST251), and then the flow shifts to a main measurement operation (step ST252). When the length L is 1 m or longer (step ST230), the flow directly shifts to the measurement operation (step ST252) as mentioned above.

In another embodiment of the present invention, whether to ignore the signal caused by flare or not is judged not according to the result of measurement in the pre-measurement but according to the detection signal from the limit switch 330 obtained in response to the focusing operation of a collimator.

Figure 15:
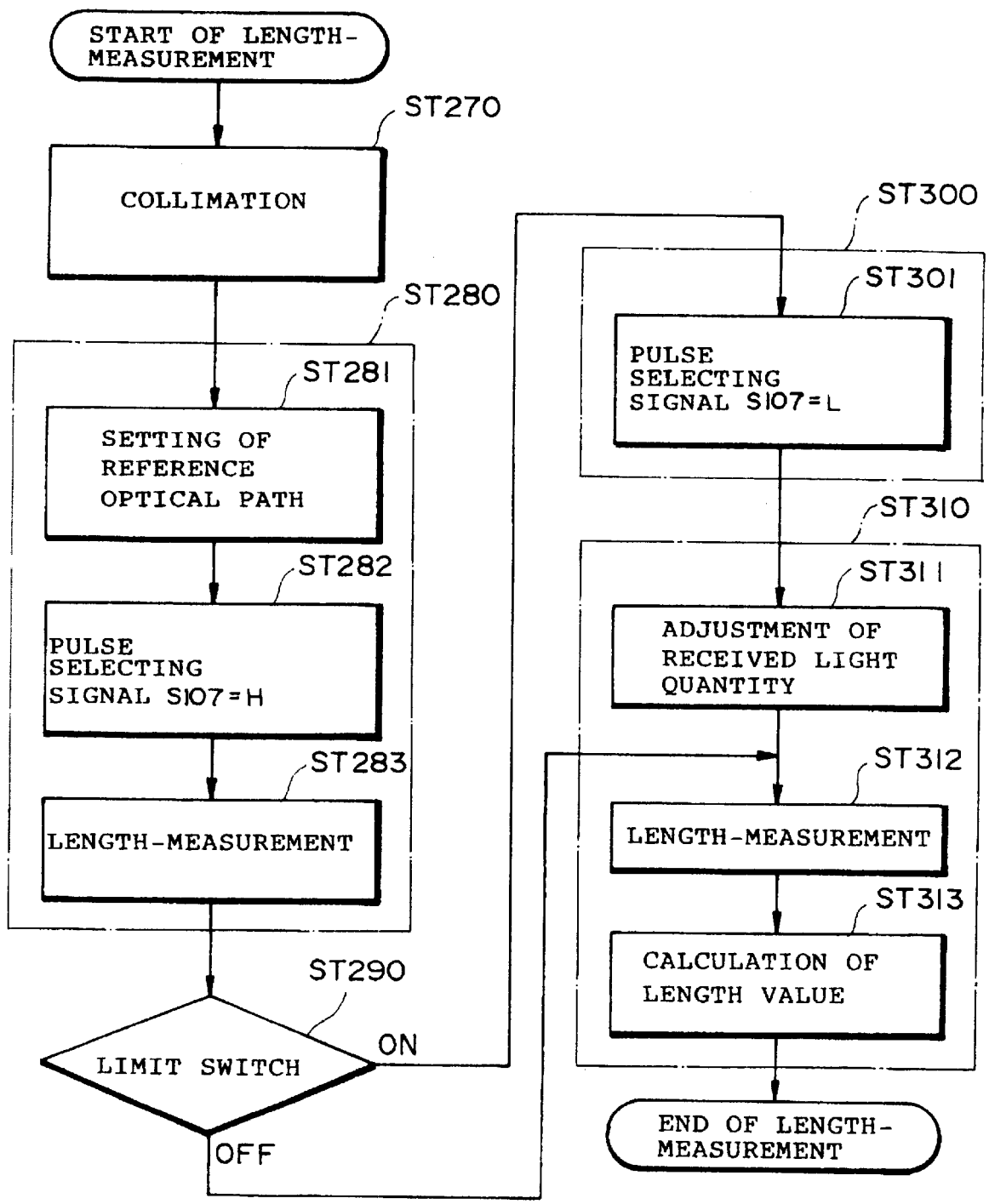
FIG. 15 is a flowchart for more specifically explaining the measurement operation shown in the flowchart of FIG. 11.

FIG. 15 shows a flowchart in the case using the limit switch 330 in synchronization with a collimator. This flowchart is substantially the same as the measurement flowchart according to pre-measurement shown in FIG. 14 except that the limit switch 330 judges whether the target is located farther or nearer than a predetermined position in this embodiment.

Namely, in the collimating step (step ST270) prior to the measurement concerning the reference optical path (steps ST281 to ST283), as the focusing lens 306 of the focusing optical system is moved to the longer distance side (toward the objective lens 305 side of the limit switch 330), the limit switch 330 detects that the target is far (step S290), and sets the pulse selecting signal S107 to its low level "L" (step ST301). Then, light quantity adjustment is effected (step ST311), and the flow proceeds to a measurement operation (step ST312). When there is no signal from the limit switch 330, the flow directly proceeds to the measurement operation, of course.

FIGS. 16A to 16M show timing charts for main parts of the received signal detector 6 in the case where flare is detected in the measurement optical path. The case where the measured value L in the pre-measurement is less than 1 m will be explained in detail with reference to FIGS. 12 and 16A to 16M. The CPU within the arithmetic controller 1 sets the pulse selecting signal S107 (FIG. 16A) to its low level "L." As a consequence, the output signal S107A (FIG. 16B) of the inverting circuit 68 fed with the pulse selecting signal S107 attains its high level "H." Since the input signal S107 is at the low level "L," the output signal S601 (FIG. 16D) of the AND circuit 66 maintains its low level "L" regardless of the emission instructing signal S102 (FIG. 16C). FIGS. 16A to 16D show these timing charts.

Also, since the signal S107A is at the high level "H," the output signal S602 (FIG. 16E) of the AND circuit 67 depends on the emission instructing signal S102 that is the other input signal. Further, since the input signal S601 is at the low level "L," the input signal S603 (FIG. 16G) of the OR circuit 65 depends on the other input signal S602A (FIG.

16F). The signal S602A is a signal obtained when the signal S602 is delayed by a predetermined amount tl. This delay amount is provided by the delay element 69. This signal S602A passes through the OR circuit 65, thereby becoming the active state signal S603.

Thus, in the case where the pulse selecting signal S107 in FIG. 16A is at the low level "L," even when the emission instructing signal S102 becomes the high level "H," the active state signal S603 in FIG. 16G does not attain its high level "H" together therewith but after the delay term tl caused by the delay element 69. As a consequence, the signal caused by the flare occurring during the delay term tl can be ignored.

The delay amount caused by the delay element 69 is set to a timing at which the signal S602A changes from the low level "L" to the high level "H" when the measured value L is several 10 m. FIGS. 16E to 16G show the foregoing timing charts.

In each of the above-mentioned cases, depending on the configuration of the delay element 69, the above-mentioned delay amount can be set by the CPU in a programmable fashion. As a consequence, in the case where the light reflected from an object existing within the distance corresponding to thus set delay amount is received as flare, its influence can be eliminated.

Hence, when the received pulse signal S105X caused by flare exists as shown in FIG. 16H, the activation of the received signal detector 6 is delayed by the delay element 69, thereby this signal would not be detected as the receive timing signal S106. Then, after the delay term tl caused by the delay element 69, the comparators 61, 62 are activated, thereby the receive timing signal S106 for the received pulse signal S105Y caused by the reflected pulse light from the target is detected as shown in FIG. 16M. Here, FIGS. 16I, 16J, 16K, and 16L show the output signal S604 of the comparator 62, the output signal S605 of the latch circuit 70, the received pulse signal S105 identical to that shown in FIG. 16H, and the output signal S105A of the delay element 34, respectively.

Thus, the received pulse signal S105X caused by flare is not used for time measurement. As a consequence, the time measurement is not influenced by the flare. As explained in the foregoing, these embodiments can provide a highly accurate distance measuring apparatus without being influenced by flare pulse signals caused by flare.

The foregoing explanation exemplifies a distance measuring apparatus having a coaxial optical system which is likely to receive flare. Though a distance measuring apparatus having a biaxial optical system receives no flare generated by the apparatus itself, it may receive the reflected light as flare from objects other than the target. When the present invention is applied to a distance measuring apparatus having a biaxial optical system, influences of such flare can be eliminated.

Industrial Applicability

As explained in the foregoing, in accordance with the present invention, whether the received signal is caused by flare or not is judged according to a measured length value which is calculated. If the received signal is caused by flare, then activation is delayed such that the received signal detector is in an inactive state when receiving flare, so as to eliminate influences thereof, and measurement is effected again. Consequently, while a high accuracy in measurement is realized without being influenced by flare, the measurement range is enhanced, thus allowing the non-prism measuring ability to improve.

Also, in the case where it is detected, at the same time when the collimation optical system is set to the in-focus position, that the target is located farther than a predetermined position, and the timing for activating the received signal detector is delayed, a distance measurement operation without error can be effected rapidly in a simple configuration.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A distance measuring apparatus comprising:

an emitter for emitting measurement pulse light into a measurement optical path between said apparatus and a target;

a receiver for receiving a reflected component of the measurement light emitted into said measurement optical path;

a detector for specifying a receiving time at which the reflected component of said measurement pulse light is received; and a controller for controlling a main measurement operation and a pre-measurement operation performed prior to the main measurement operation each measuring the period of time between an emitting time at which said measurement pulse light is emitted and the receiving time of the reflected component of said measurement pulse light and calculating a length of said measurement optical path on the basis of thus obtained time information; said controller inhibiting, when the calculated value obtained in the pre-measurement operation is not greater than a predetermined value, said detector from effecting the specifying operation for a predetermined period of time from the emitting time of said measurement pulse light in the main measurement operation.

2. The apparatus according to claim 1, further comprising:

a reference optical path which is different from said measurement optical path; and a switching mechanism for causing said receiver to selectively receive one of the reflected component of said measurement pulse light propagated through said measurement optical path and a reference pulse light propagated through said reference optical path.

3. A distance measuring apparatus comprising:

an emitter for emitting measurement pulse light into a measurement optical path between said apparatus and a target;

a receiver for receiving a reflected component of the measurement light emitted into said measurement optical path;

a detector for specifying a receiving time at which the reflected component of said measurement pulse light is received;

a collimator having an optical system for focusing an image of said target onto a predetermined position; and a controller for controlling a measurement operation measuring the period of time between an emitting time at which said measurement pulse light is emitted and the receiving time of the reflected component of said measurement pulse light and calculating a length of said measurement optical path on the basis of thus obtained time information; said controller inhibiting, when a distance value from said apparatus to said target corresponding to an in-focus position of the optical system in said collimator is not less than a predetermined value, said detector from effecting the specifying operation for a predetermined period of time from the emitting time of said measurement pulse light in the measurement operation.

4. The apparatus according to claim 3, further comprising:

a reference optical path which is different from said measurement optical path; and a switching mechanism for causing said receiver to selectively receive one of the reflected component of said measurement pulse light propagated through said measurement optical path and a reference pulse light propagated through said reference optical path.

5. The apparatus according to claim 3, further comprising:

a limit switch for specifying the in-focus position of the optical system in said collimator so as to judge whether the distance value from said apparatus to said target corresponding to the in-focus position of said optical system exceeds the predetermined value or not.

6. A method of measuring a distance from a target to a distance measuring apparatus utilizing pulse light, said method comprising:

a first step of effecting a pre-measurement operation measuring a length of a measurement optical path between said target and a pulse generating source and comprising:

a first substep of emitting measurement pulse light into said measurement optical path, a second substep of receiving a reflected component of said measurement pulse light emitted into said measurement optical path, a third substep of specifying a receiving time at which the reflected component of said measurement pulse light is received, and a fourth substep of measuring the period of time between an emitting time at which said measurement pulse light is emitted and the receiving time of the reflected component of said measurement pulse light and calculating the length of said measurement optical path on the basis of thus obtained time information; and a second step, effected subsequent to said first step, of executing a main measurement operation measuring a length of measurement optical path between said target and a pulse generating source and comprising:

a first substep of emitting measurement pulse light into said measurement optical path, a second substep of receiving a reflected component of said measurement pulse light emitted into said measurement optical path, a third substep of specifying a receiving time at which the reflected component of said measurement pulse light is received, and a fourth substep of measuring the period of time between an emitting time at which said measurement pulse light is emitted and the receiving time of the reflected component of said measurement pulse light and calculating the length of said measurement optical path on the basis of thus obtained time information, wherein the main measurement operation is executed in a state where, when a calculated value obtained in the pre-measurement operation is not greater than a predetermined value, said third substep in said second step is inhibited for a predetermined period of time from the emitting time of said measurement pulse light.

7. The method according to claim 6, wherein emission of the measurement pulse light into said measurement optical path and emission of a reference pulse light into a reference optical path different from said measurement optical path are selectively switched therebetween so as to measure the respective lengths of said measurement optical path and the reference optical path.

8. A method of measuring a distance from a target to a distance measuring apparatus equipped with a collimator having an optical system for focusing an image of said target onto a predetermined position, said method comprising:

a first step of adjusting said optical system so as to focus the image of said target onto the predetermined position, thereby obtaining a distance from said collimator to said target corresponding to an in-focus position of said optical system; and a second step of effecting a measurement operation, the measurement operation comprising:

a first substep of emitting measurement pulse light into said measurement optical path, a second substep of receiving a reflected component of said measurement pulse light emitted into said measurement optical path, a third substep of specifying a receiving time at which the reflected component of said measurement pulse light is received, and a fourth substep of measuring the period of time between an emitting time at which said measurement pulse light is emitted and the receiving time of the reflected component of said measurement pulse light and calculating the length of said measurement optical path on the basis of thus obtained time information, wherein, when a distance value obtained in said first step is not less than a predetermined value, said third substep in said second step is inhibited for a predetermined period of time from the emitting time of said measurement pulse light.

9. The method according to claim 8, wherein emission of the measurement pulse light into said measurement optical path and emission of a reference pulse light into a reference optical path different from said measurement optical path are selectively switched therebetween so as to measure the respective lengths of said measurement optical path and the reference optical path.

* * * * *